United States Patent [19]
Matsuoka

[11] Patent Number: 5,345,907
[45] Date of Patent: Sep. 13, 1994

[54] ENGINE CONTROL SYSTEM

[75] Inventor: Toshihiro Matsuoka, Hiroshima, Japan

[73] Assignee: Mazda Motor Corporation, Hiroshima, Japan

[21] Appl. No.: 38,337

[22] Filed: Mar. 12, 1993

[30] Foreign Application Priority Data

Mar. 17, 1992 [JP] Japan .................... 4-059969

[51] Int. Cl.$^5$ ............................ F02D 29/02
[52] U.S. Cl. ................................ 123/399
[58] Field of Search ............. 123/350, 352, 361, 399; 180/179

[56] References Cited

U.S. PATENT DOCUMENTS

| | | | |
|---|---|---|---|
| 4,597,049 | 6/1986 | Murakami | 123/352 X |
| 4,637,280 | 1/1987 | Oshiage | 74/866 |
| 4,735,181 | 4/1988 | Kaneko et al. | 123/399 X |
| 4,781,163 | 11/1988 | Jautelat et al. | 123/492 |
| 4,823,749 | 4/1989 | Eisenmann et al. | 123/399 X |
| 4,901,695 | 2/1990 | Kabasin et al. | 123/399 |
| 4,908,764 | 3/1990 | Etoh | 123/352 X |
| 4,984,545 | 1/1991 | Kaneyasu et al. | 123/399 |

FOREIGN PATENT DOCUMENTS 59-122745  7/1984  Japan .
268943  11/1988  Japan ............... 123/399

OTHER PUBLICATIONS

Patent Abstracts of Japan, vol. 10, No. 200 (M-498), Jul. 12, 1986, abstract of JP-A-61043233.

Primary Examiner—Tony M. Argenbright
Attorney, Agent, or Firm—Sixbey, Friedman, Leedom & Ferguson

[57] ABSTRACT

An engine control system for a vehicle which controls the output of the engine in response to change in the accelerator depression detects the accelerator depression fluctuation rate and the vehicle speed fluctuation rate. The control system increases the change in the engine output for a given change in the accelerator depression when the accelerator depression fluctuation rate is large and the vehicle speed fluctuation rate is small and reduces the same when the change in the accelerator depression fluctuation rate is small and the vehicle speed fluctuation rate is large.

5 Claims, 10 Drawing Sheets

F I G. 11
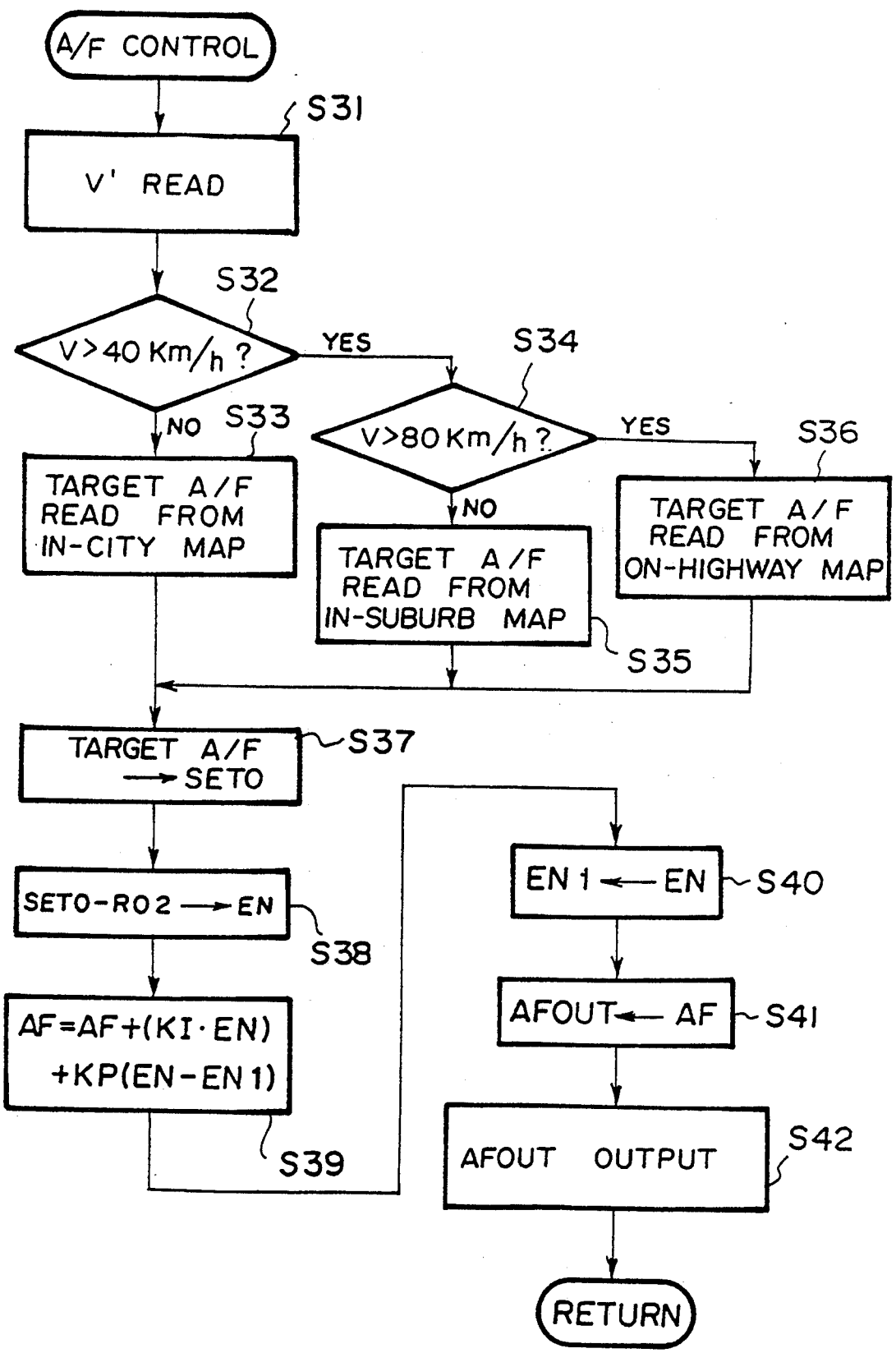

ENGINE CONTROL SYSTEM

BACKGROUND OF THE INVENTION

1. Field of the Invention

This invention relates to an engine control system for a vehicle.

2. Description of the Prior Art

There has been proposed an electric throttle system in which the throttle valve is mechanically disconnected from the accelerator pedal and is electrically driven by an actuator such as an electric motor in response to depression of the accelerator pedal. In an accelerator control system disclosed, for instance, in Japanese Unexamined Patent Publication No. 59(1984)-122745, when the change of amount of depression of the accelerator pedal is small, a throttle control gain is reduced so that the change of the throttle opening for a given change of the accelerator depression is reduced, thereby facilitating fine control of the vehicle speed, and when the change of the accelerator depression is large, the throttle control gain is increased so that the change of the throttle opening for a given change of the accelerator depression is increased, thereby ensuring a better acceleration performance conforming to the driver's will.

However since the running state is affected by the current of traffic, if the throttle control gain is changed simply according to the amount of change of the accelerator depression, stability in control and fuel economy will deteriorate.

SUMMARY OF THE INVENTION

In view of the foregoing observations and description, the primary object of the present invention is to provide an engine control system which can present a better acceleration performance conforming to the driver's will and improve the fuel economy without deteriorating the controllability of the vehicle.

In accordance with the present invention, there is provided an engine control system for a vehicle comprising a first detecting means which detects the state of driver's operation, a second detecting means which detects the change in the running state of the vehicle with respect to the state of the driver's operation, a comparator means which compares the change in the state of the driver's operation detected by the first detecting means with the change in the running state of the vehicle detected by the second detecting means, and an engine output control means which controls the output of the engine in response to a driver's operation, wherein said engine output control means increases the change in the engine output for a given amount of driver's operation when said comparator means determines that the change in the state of the driver's operation is large and the change in the running state of the vehicle is small and reduces the same when said comparator means determines that the change in the state of the driver's operation is small and the change in the running state of the vehicle is large.

Said change in the state of the driver's operation can be represented by the accelerator depression fluctuation rate and said change in the running state of the vehicle can be represented by the vehicle speed fluctuation rate. The accelerator depression fluctuation rate and the vehicle speed fluctuation rate are defined as follows:

accelerator depression fluctuation rate = (standard deviation of the accelerator depression/mean accelerator depression) × 100% vehicle speed fluctuation rate = (standard deviation of the vehicle speed/mean vehicle speed) × 100%

BRIEF DESCRIPTION OF THE DRAWINGS

FIG. 11 is a flow chart showing the air-fuel ratio control routine in which the maps shown in FIG. 9 and 10A to 10C are employed, and FIG. 12 a flow chart which the control unit executes when it selectively performs the engine output control by the throttle control and that by the air-fuel ratio control.

DESCRIPTION OF THE PREFERRED EMBODIMENT

Figure 1:
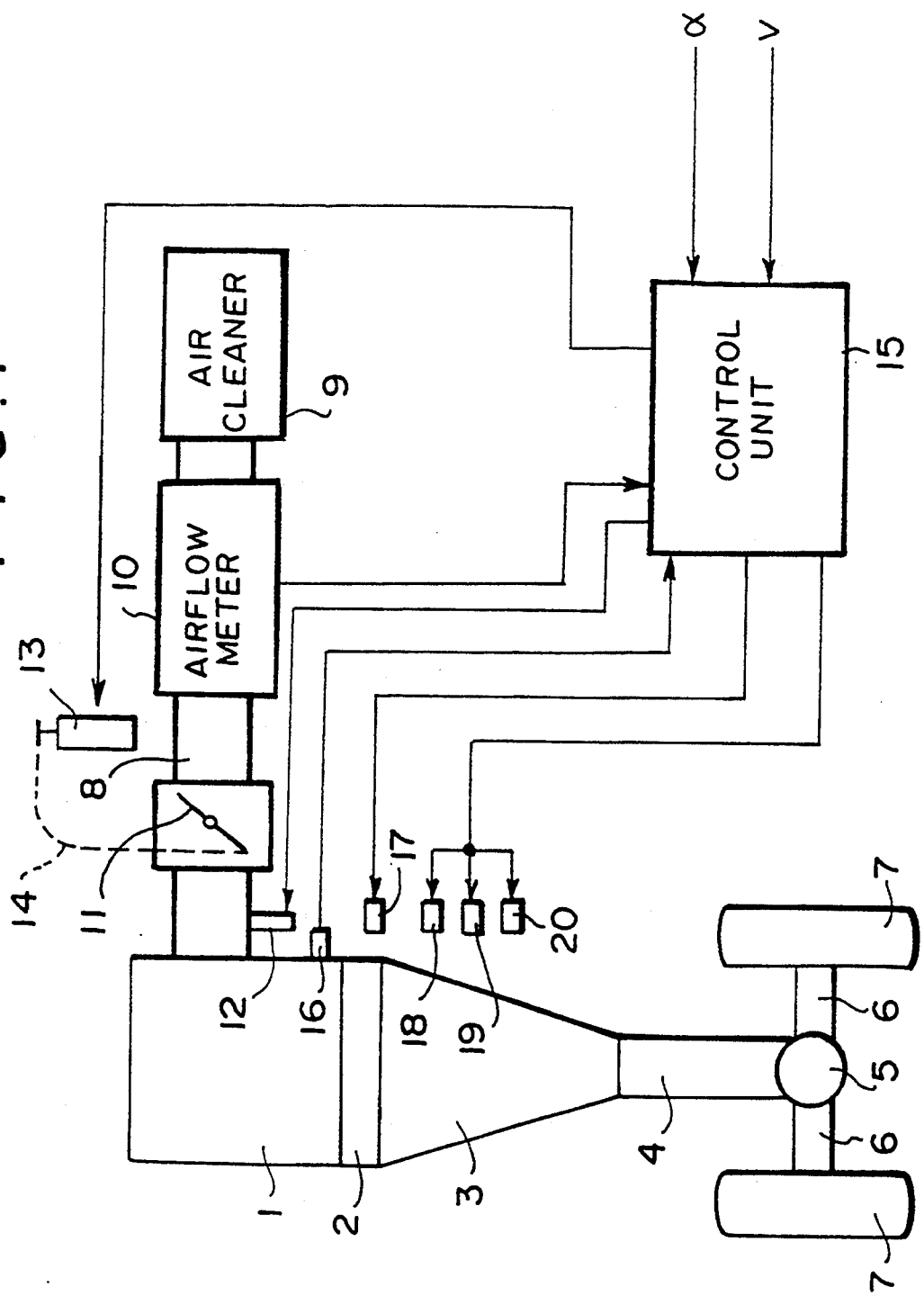
FIG. 1 is a schematic view showing an engine control system in accordance with an embodiment of the present invention.

In FIG. 1, a vehicle provided with an engine control system in accordance with an embodiment of the present invention has a power train comprising an engine 1, a torque convertor 2 and automatic transmission 3. The output torque of the engine 1 is transmitted to left and right driving wheels 7 through the torque convertor 2, the automatic transmission 3, a propeller shaft 4, a differential 5 and left and right axles 6.

The engine 1 has an intake passage 8 in which an air cleaner 9, an airflow meter 10, a throttle valve 11 and a fuel injection valve 12 in this order from the upstream side. The throttle valve 11 is opened and closed by a throttle actuator 13 by way of a wire link 14.

The power train is controlled by a control unit 15 which comprises a micro computer. The control unit 15 receives a signal output from the airflow meter 10 representing the amount of intake air, an air-fuel ratio signal output from an O$_2$-sensor (linear O$_2$-sensor) disposed in an exhaust passage (not shown) of the engine 1, an accelerator depression signal representing the accelerator depression (the amount of depression of the accelerator pedal) α and a vehicle speed signal representing the vehicle speed V, and performs predetermined controls.

That is, the control unit 15 performs an air-fuel ratio control for controlling the amount of fuel to be injected from the fuel injection valve 12 according to predetermined air-fuel ratio characteristics, a throttle control for controlling the opening of the throttle valve 11 according to the accelerator depression α and a gear-shift control for controlling the automatic transmission 3 by way of a lockup solenoid 17 and first to third gear-shifting solenoids 18 to 20.

The throttle control by the control unit 15 will be described with reference to the flow charts shown in FIGS. 2 and 3.

Figure 2:
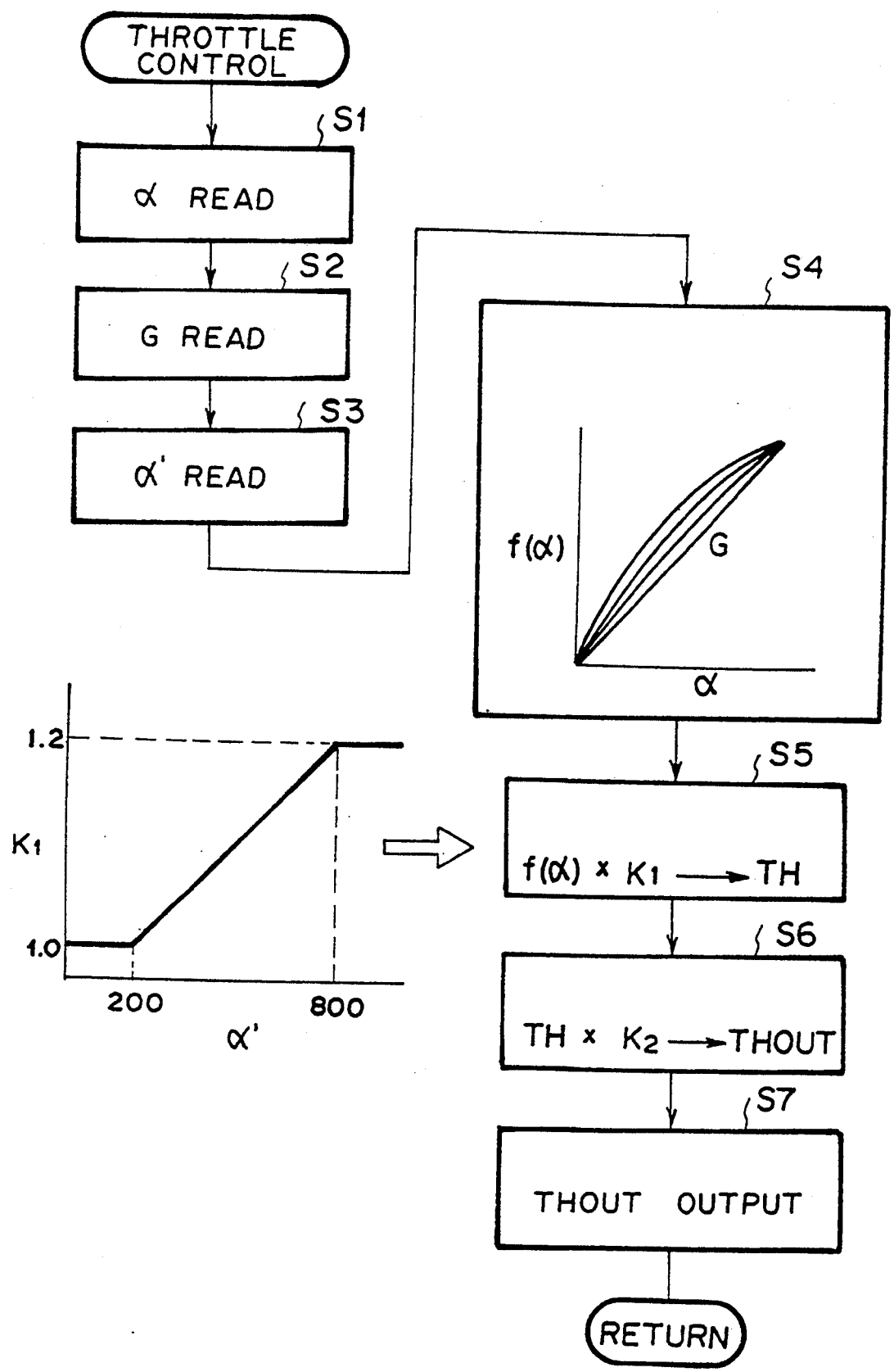
FIG. 2 is a flow chart showing a throttle control routine.

In FIG. 2, the control unit 15 reads the accelerator depression α, the gear position G and the rate of depression α' of the accelerator. (steps S1 to S3) The control unit 15 then obtains a base throttle opening f(α) for the accelerator depression α from a throttle opening map in which the base throttle opening f(α) is related to the accelerator depression α with the gear position G used as a parameter. (step S4) In step S5, the control unit 15 reads out an accelerator-depression-rate-based correction gain K1 (K1=1 to 1.2) for the rate of depression α' of the accelerator from a correction gain map and obtains an accelerator-depression-rate-counted throttle opening TH by multiplying the base throttle opening f(α) by the correction gain K1. Then the control unit 15 obtains an output throttle opening THOUT by multiplying the accelerator-depression-rate-counted throttle opening TH by a traffic-current-based correction gain K2 which will be described later and outputs a control signal representing the output throttle opening THOUT to the throttle actuator 13.

Figure 3:
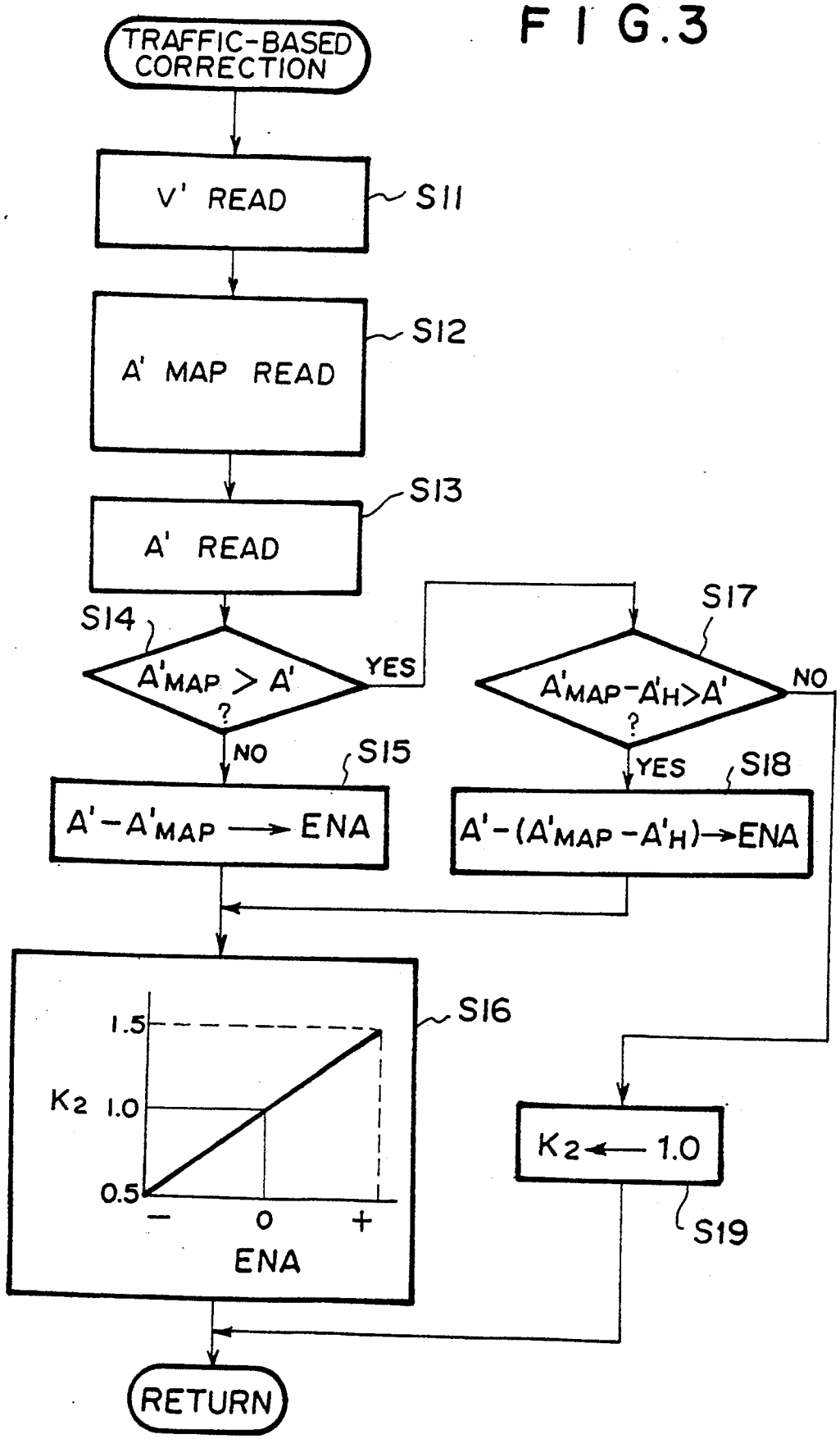
FIG. 3 is a flow chart showing a routine for obtaining the traffic-current-based correction gain which is a sub routine of the throttle control routine.

FIG. 3 shows a flow chart for illustrating a routine for obtaining the traffic-current-based correction gain K2. For the purpose of this correction, there is prepared a map in which a reference threshold value of an accelerator depression fluctuation rate A' is related to a vehicle speed fluctuation rate V' as shown in FIG. 4.

The accelerator depression fluctuation rate A' and the vehicle speed fluctuation rate V' are defined as follows.

accelerator depression fluctuation rate A'=(standard deviation of the accelerator depression/mean accelerator depression)×100% vehicle speed fluctuation rate V'=(standard deviation of the vehicle speed/mean vehicle speed)×100%

Figure 4:
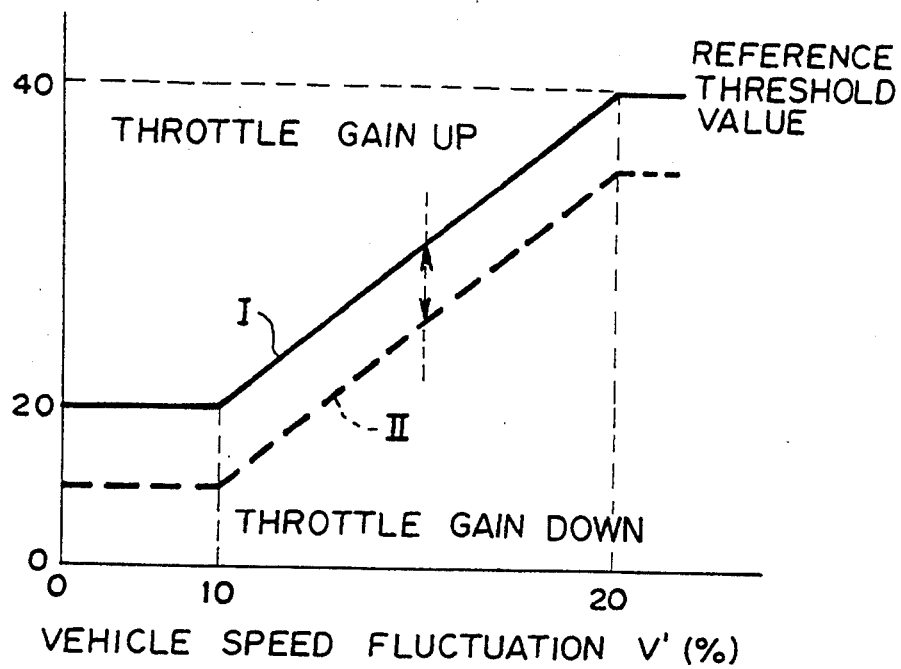
FIG. 4 is a map in which the reference threshold value of the accelerator depression fluctuation rate is related to the vehicle speed fluctuation rate.

In the map shown in FIG. 4, the value of the accelerator depression fluctuation rate A' on the solid line I corresponding to a given value of the vehicle speed fluctuation rate V' is a map value $A'_{MAP}$ of the accelerator depression fluctuation rate A' for the vehicle speed fluctuation rate V'. The region between the solid line I and the broken line II is a hysteresis region.

In FIG. 3, the control unit 15 first reads the vehicle speed fluctuation rate V' and reads the map value $A'_{MAP}$ of the accelerator depression fluctuation rate A' for the vehicle speed fluctuation rate V'. (steps S11 and S12) Then the control unit 15 reads the actual value of the accelerator depression fluctuation rate A' in step S13. The control unit 15 in step S14 determines whether the map value $A'_{MAP}$ is larger than the actual value of the accelerator depression fluctuation rate A'. When the former is not larger than the latter, the control unit 15 obtains a deviation ENA ($\geq 0$) by subtracting the map value $A'_{MAP}$ from the actual value of the accelerator depression fluctuation rate A' in step S15, and calculates in step S16 the traffic-current-based correction gain K2 according to a map in which the traffic-current-based correction gain K2 is related to the deviation ENA.

That is, when the map value $A'_{MAP}$ is not larger than the actual value of the accelerator depression fluctuation rate A', the accelerator depression fluctuation rate A' is on the line I or above the line I in the map shown in FIG. 4 and the deviation ENA is zero or positive. Accordingly, the traffic-current-based correction gain K2 is not smaller than 1.0 and not larger than 1.5, whereby the throttle control gain is increased.

On the other hand, when it is determined in step S14 that the map value $A'_{MAP}$ is larger than the actual value of the accelerator depression fluctuation rate A', the control unit 15 compares the actual value of the accelerator depression fluctuation rate A' with the value obtained by subtracting the hysteresis value $A'_H$ from the map value $A'_{MAP}$, i.e., the value corresponding to the vehicle speed fluctuation rate V' on the broken line II. (step S17) When the former is smaller than the latter, the control unit 15 obtains the deviation ENA ($<0$) by subtracting the latter from the former (step S18) and then calculates in step S16 the traffic-current-based correction gain K2 corresponding to the deviation ENA. That is, when the actual value of the accelerator depression fluctuation rate A' is smaller than the value obtained by subtracting the hysteresis value $A'_H$ from the map value $A'_{MAP}$, the accelerator depression fluctuation rate A' is below the line II in the map shown in FIG. 4 and the deviation ENA is negative. Accordingly, the traffic-current-based correction gain K2 is not smaller than 0.5 and smaller than 1.0, whereby the throttle control gain is reduced. When it is determined in step S17 that the actual value of the accelerator depression fluctuation rate A' is not smaller than the value obtained by subtracting the hysteresis value $A'_H$ from the map value $A'_{MAP}$, that is, when the actual value of the accelerator depression fluctuation rate A' for the vehicle speed fluctuation rate V' is in the hysteresis region between the solid line I and the broken line II, the control unit 15 sets the traffic-current-based correction gain K2 to 1.0 in step S19.

The control unit 15 performs the air-fuel ratio control on the basis of the accelerator depression fluctuation rate A' and the vehicle speed fluctuation rate V' in the following manner in addition to the throttle control. The control unit 15 sometimes selectively performs one of the throttle control and the air-fuel ratio control.

Figure 5:
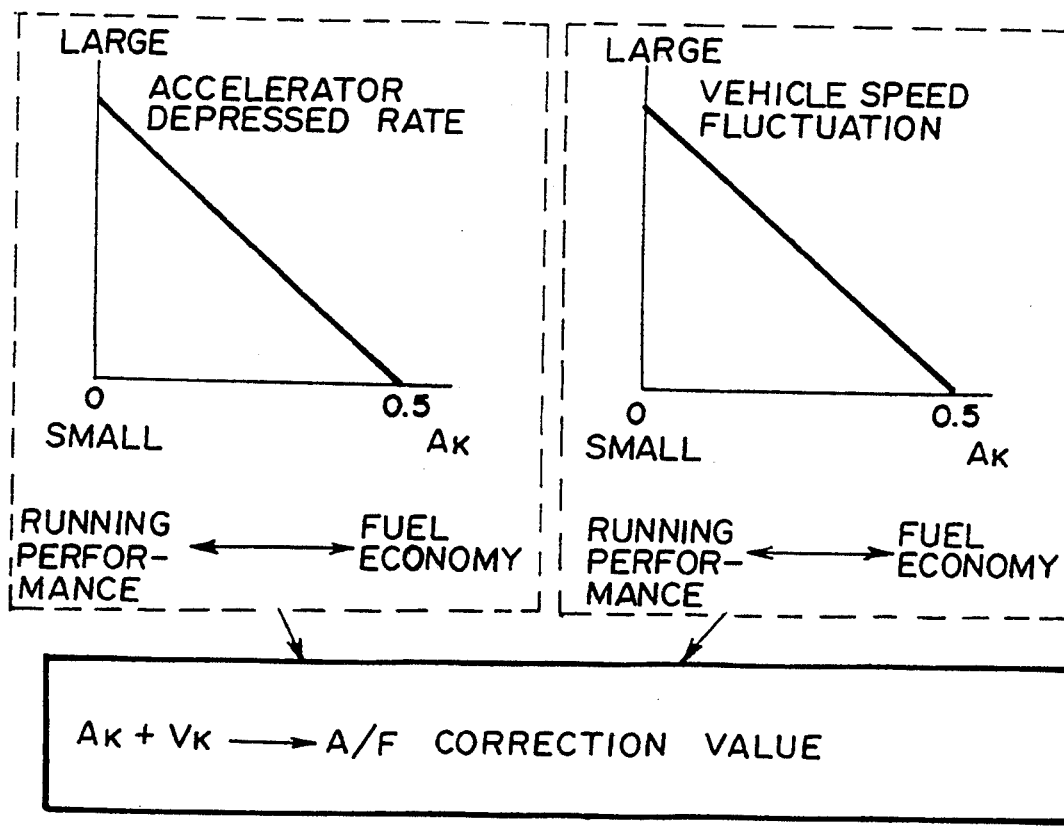
FIG. 5 is a view for illustrating the manner of obtaining the air-fuel ratio correction value.
Figure 6:
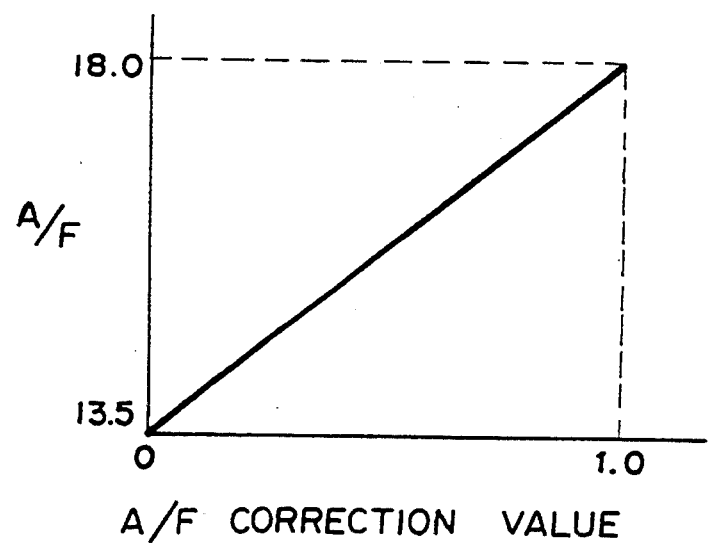
FIG. 6 is a map for obtaining the air-fuel ratio on the basis of the air-fuel ratio correction value.

First an accelerator-depression-fluctuation-rate-based correction value map and a vehicle-speed-fluctuation-rate-based correction value map such as shown in FIG. 5 are prepared. In the maps shown in FIG. 5, it is considered that the driver more emphasizes the running performance as the accelerator depression fluctuation rate A' and the vehicle speed fluctuation rate V' increase, and the accelerator-depression-fluctuation-rate-based correction value Ak and the vehicle-speed-fluctuation-rate-based correction value Vk are reduced toward 0 as the accelerator depression fluctuation rate A' and the vehicle speed fluctuation rate V' increase. Further it is considered that the driver more emphasizes the fuel economy as the accelerator depression fluctuation rate A' and the vehicle speed fluctuation rate V' decrease, and the accelerator-depression-fluctuation-rate-based correction value Ak and the vehicle-speed-fluctuation-rate-based correction value Vk are increased toward 0.5 as the accelerator depression fluctuation rate A' and the vehicle speed fluctuation rate V' decrease. The control unit 15 obtains an air-fuel ratio correction value by adding the correction values Ak and Vk and calculates an air-fuel ratio on the basis of the air-fuel ratio correction value (Ak+Vk) according to the map shown in FIG. 6. In the map shown in FIG. 6, the air-fuel ratio is reduced toward the stoichiometric air-fuel ratio 13.5 as the air-fuel ratio correction value decreases toward 0 and is increased toward 18.0 as the air-fuel ratio correction value increases toward 1.0.

Figure 7:
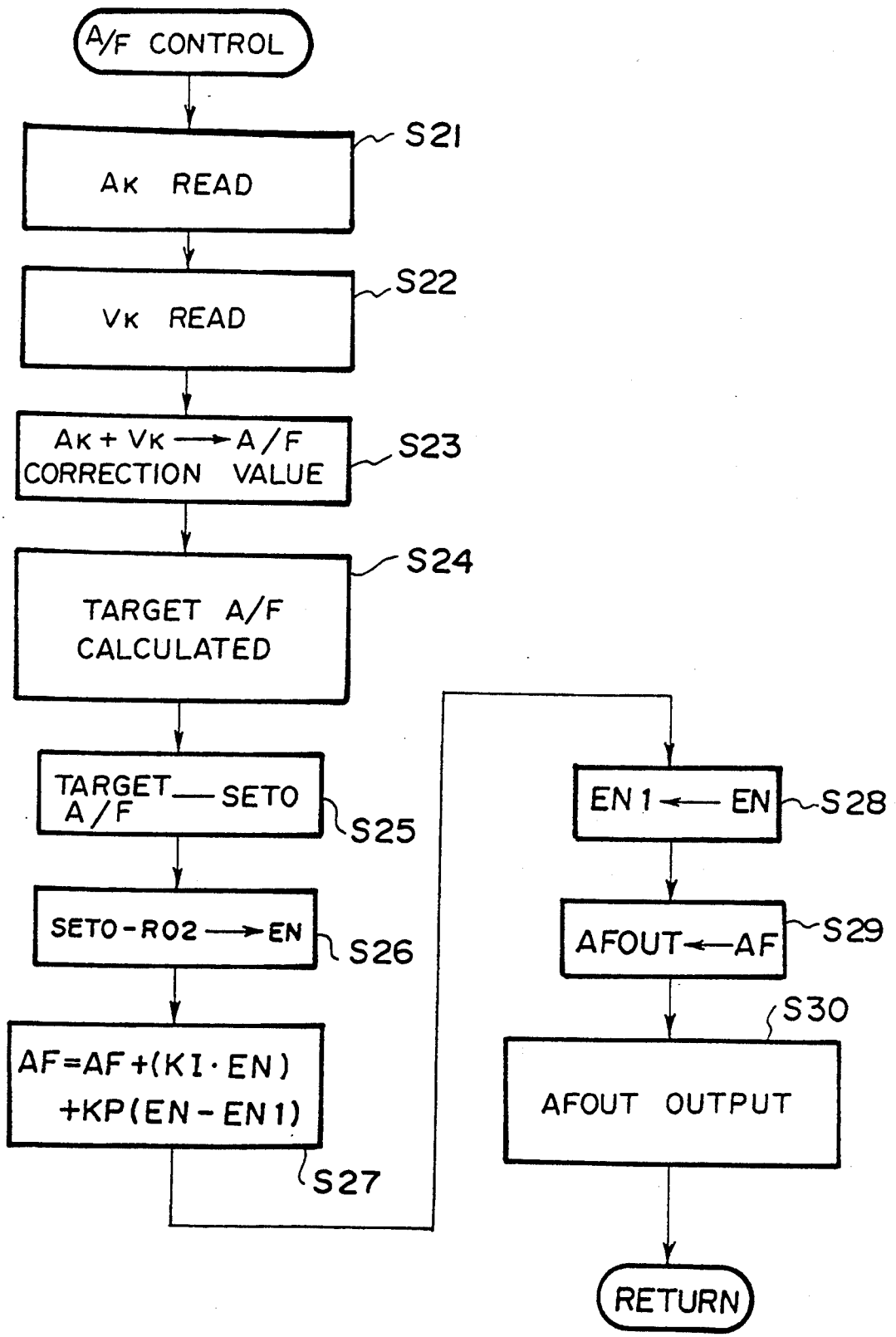
FIG. 7 is a flow chart showing the air-fuel ratio control routine.

FIG. 7 shows a flow chart of the air-fuel ratio control routine. In FIG. 7, the control unit 15 reads the correction values Ak and Vk in steps S21 and S22, and adds then to obtain the air-fuel ratio correction value in step S23. Then in step S24, the control unit 15 calculates the air-fuel ratio A/F on the basis of the air-fuel ratio correction value (Ak+Vk) according to the map shown in FIG. 6. The control unit 15 sets the air-fuel ratio A/F as a target air-fuel ratio SETO in step S25 and subtracts the present air-fuel ratio RO2 from the target air-fuel ratio SETO, thereby obtaining a deviation EN (step S26). Then in step S27, the control unit 15 calculates an air-fuel ratio A/F for the normal PI feedback control wherein EN1 represents the preceding deviation, KI represents the integral term and KP represents the proportional term. Then the control unit 15 substitutes the present deviation EN for the preceding deviation EN1, sets the air-fuel ratio A/F calculated in step S27 as the output air-fuel ratio AFOUT and outputs a signal representing the output air-fuel ratio AFOUT to the fuel injection valve 12. (steps S28 to S30)

Figure 8:
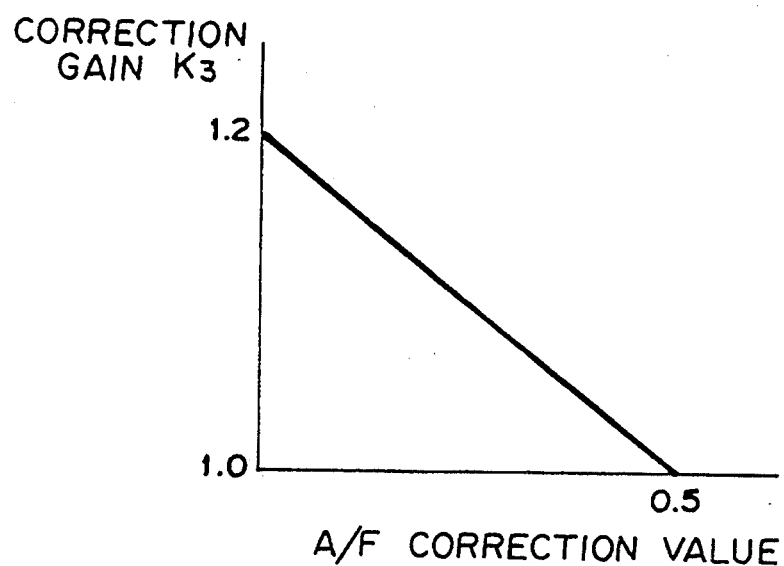
FIG. 8 is a map for obtaining the traffic-current-based correction value on the basis of the air-fuel ratio correction value.

A correction gain K3 obtained from the map shown in FIG. 8 on the basis of the air-fuel ratio correction value obtained in step S23 may be used in place of the traffic-current-based correction gain K2 in step S6 of the throttle control shown in FIG. 2.

Figure 9:
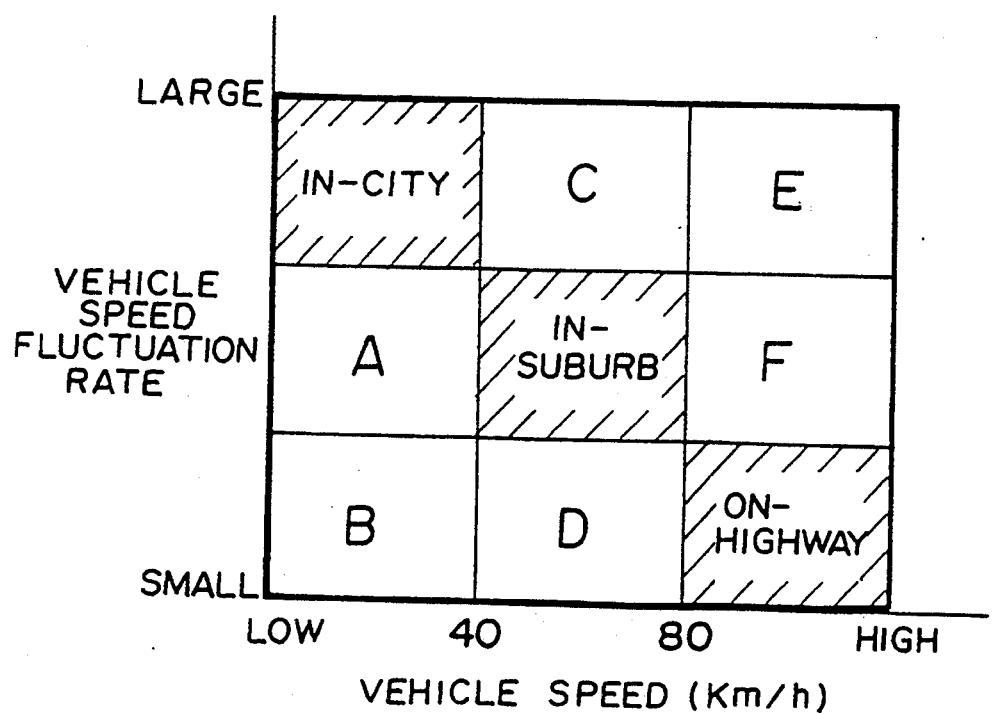
FIG. 9 is a map in which the running state of the vehicle is related to the vehicle speed and the vehicle speed fluctuation rate.
Figure 10A:
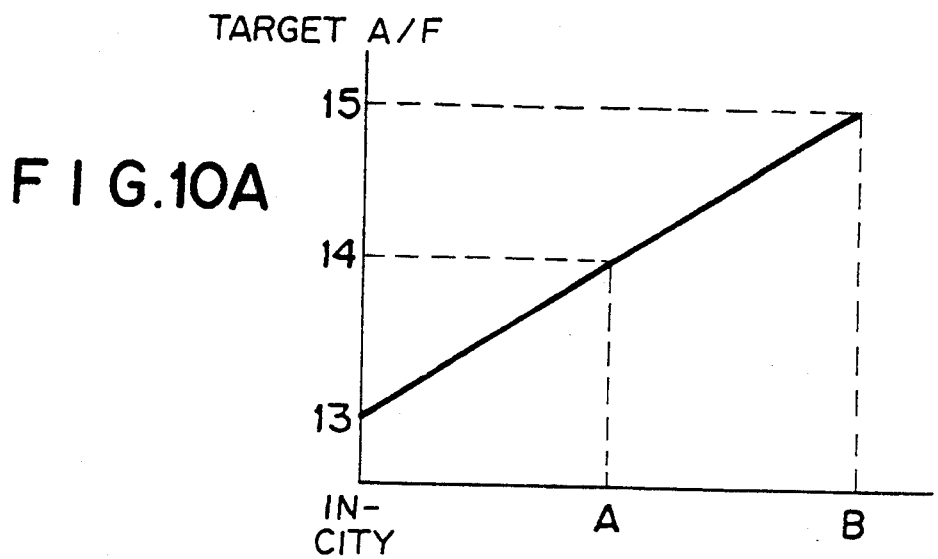
FIGS. 10A to 10C are maps in which the target air-fuel ratio is related to the respective regions in FIG. 9.
Figure 10B:
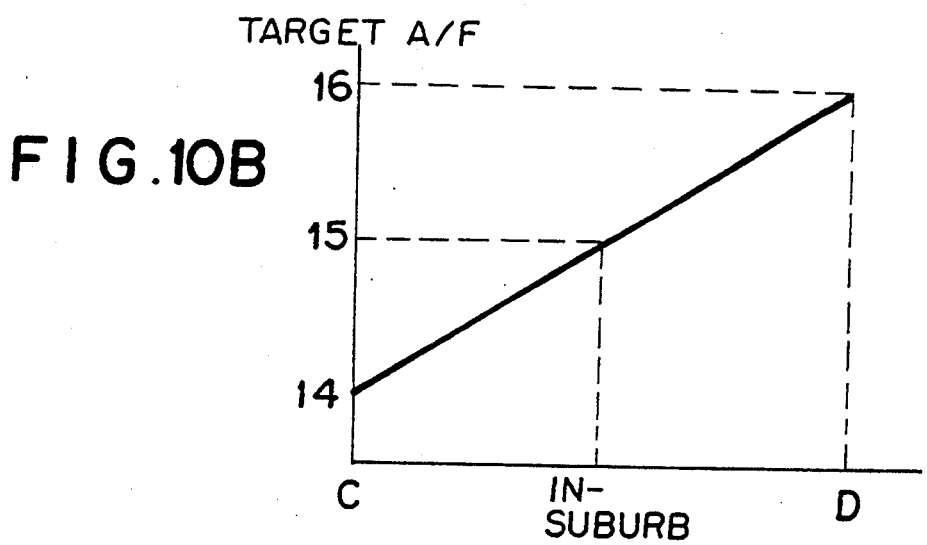
Figure 10C:
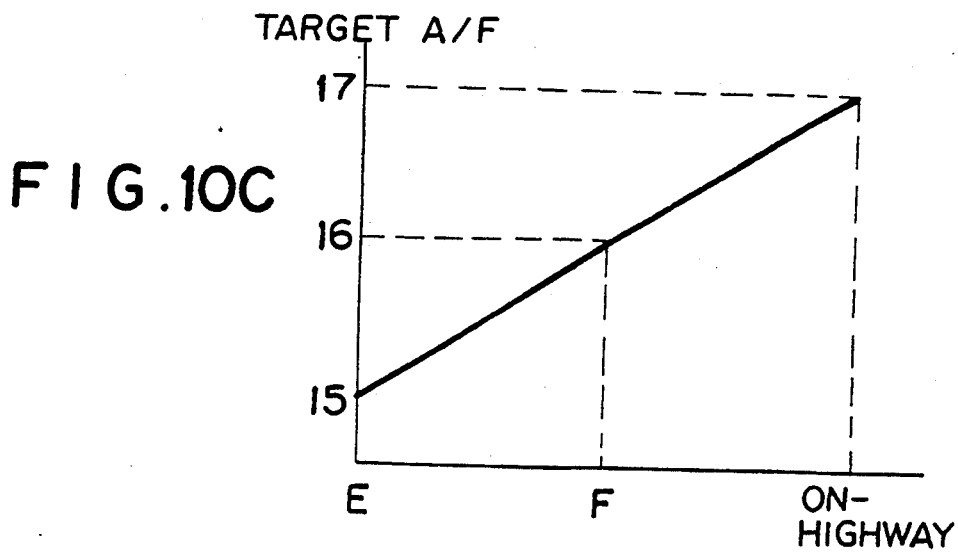

Though, in the air-fuel ratio control routine shown in FIG. 7, the target air-fuel ratio in the feedback control of the air-fuel ratio is set based on both the accelerator depression fluctuation rate and the vehicle speed fluctuation rate, it may be set based on only one of them. That is, as shown in FIG. 9, the running state of the vehicle is broadly divided into three, in-city, in-suburb and on-highway, according to the vehicle speed and the vehicle speed fluctuation rate, and then each of them are further divided into three according to the vehicle speed fluctuation rate. Thus the running state of the vehicle is divided into nine regions. The target air-fuel ratio corresponding to a given region may be obtained from the maps shown in FIGS. 10A to 10C. In the maps shown in FIGS. 10A to 10C, the target air-fuel ratio is made leaner as the vehicle speed increases.

FIG. 11 shows an air-fuel ratio control routine in which the maps shown in FIG. 9 and 10A to 10C are employed.

The control unit 15 reads the vehicle speed fluctuation rate V' in step S31 and determines whether the vehicle speed V is higher than 40 Km/h in step S32. When it is determined that the former is not higher than the latter, the control unit 15 proceeds to step S33 and reads the target air-fuel ratio from the map for in-city running shown in FIG. 10A. When it is determined in step S32 that the vehicle speed V is higher than 40 Km/h, the control unit 15 proceeds to step S34 and determines whether the vehicle speed V is higher than 80 Km/h. When it is determined that the former is not higher than the latter, the control unit 15 proceeds to step S35 and reads the target air-fuel ratio from the map for in-suburb running shown in FIG. 10B. When it is determined in step S34 that the vehicle speed is higher than 80 Km/h, the control unit 15 proceeds to step S36 and reads the target air-fuel ratio from the map for on-highway running shown in FIG. 10C. After the target air-fuel ratio is thus obtained, the control unit 15 executes steps S37 to S42 which are the same as the steps S25 to S30 in the flow chart shown in FIG. 7.

Figure 12:
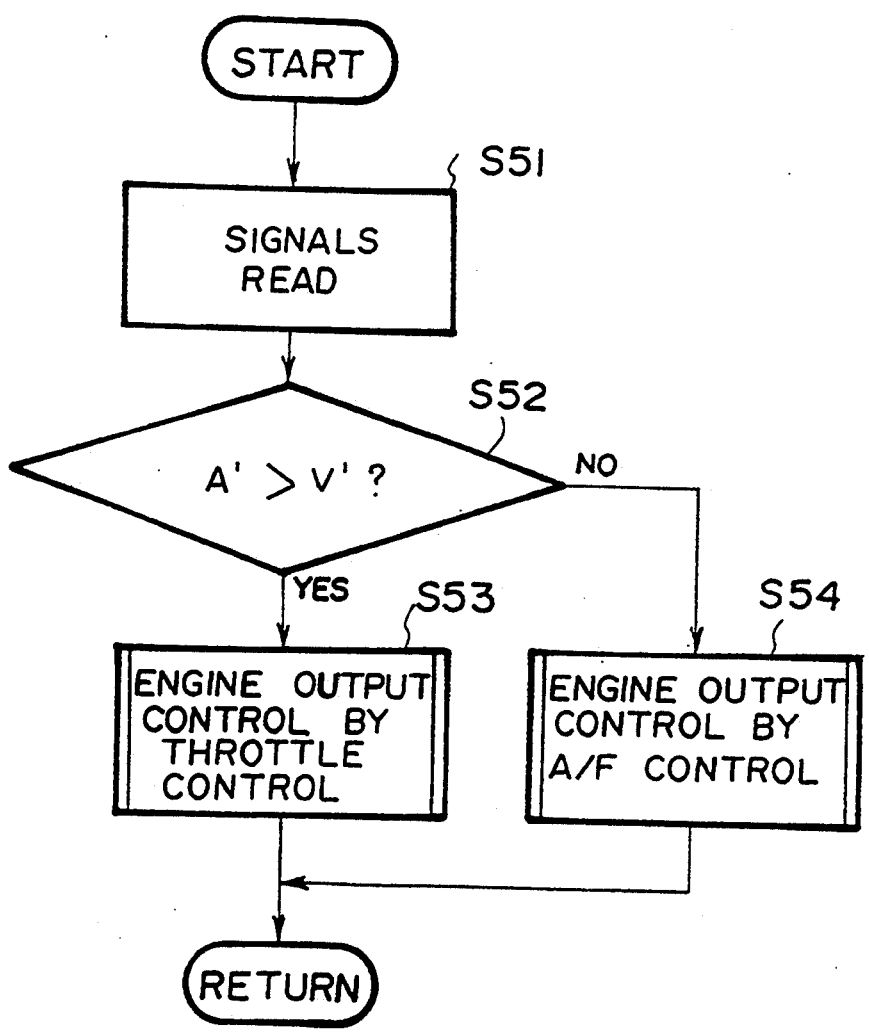

Further the control unit 15 may perform one of the engine output control by the throttle control and that by the air-fuel ratio control according to the relation between the accelerator depression fluctuation rate A' and the vehicle speed fluctuation rate V' as shown in FIG. 12. That is, in the flow chart shown in FIG. 2, the control unit 15 performs the engine output control by the throttle control when the accelerator depression fluctuation rate A' is larger than the vehicle speed fluctuation rate V' (steps S51, S52 and S53) and otherwise performs the engine output control by the air-fuel ratio control (steps S51, S52 and S54).

What is claimed is;

1. An engine control system for a vehicle comprising
a first detecting means which detects the state of driver operation for the engine,
a second detecting means which detects the change in the running state of the vehicle with respect to the state of the driver operation,
a comparator means which compares the change in the state of the driver operation detected by the first detecting means with the change in the running state of the vehicle detected by the second detecting means, and
an engine output control means which controls the output of the engine in response to a driver operation,
wherein said engine output control means increases the change in the engine output for a given amount of driver operation when said comparator means determines that the change in the state of the driver operation is large and the change in the running state of the vehicle is small and reduces the same when said comparator means determines that the change in the state of the driver operation is small and the change in the running state of the vehicle is large.

2. An engine control system as defined in claim 1 in which said change in the state of the driver operation detected by the first detecting means is represented by the accelerator depression fluctuation rate and said change in the running state of the vehicle detected by the second detecting means is represented by the vehicle speed fluctuation rate.

3. An engine control system as defined in claim 2 in which said engine output control means increases or reduces the change in the engine output for a given amount of driver operation by changing a throttle control gain and the engine output control means increases the throttle control gain when the accelerator depression fluctuation rate is larger than a threshold value which increases with increase of the vehicle speed fluctuation rate.

4. An engine control system as defined in claim 1 in which said engine output control means increases or reduces the change in the engine output for a given amount of driver operation by changing a throttle control gain when said comparator means determines that the change in the state of the driver operation is larger than the change in the running state of the vehicle and otherwise increases or reduces the same by changing the air-fuel ratio.

5. An engine control system for a vehicle comprising a first detecting means which detects the accelerator depression fluctuation rate, a second detecting means which detects the vehicle speed fluctuation rate, a comparator means which compares the accelerator depression fluctuation rate detected by the first detecting means with the vehicle speed fluctuation rate detected by the second detecting means, and an engine output control means which controls the output of the engine in response to change in the accelerator depression, wherein said engine output control means increases the change in the engine output for a given change in the accelerator depression when said comparator means determines that the change in the accelerator depression fluctuation rate is large and the vehicle speed fluctuation rate is small and reduces the same when said comparator means determines that the change in the accelerator depression fluctuation rate is small and the vehicle speed fluctuation rate is large.

* * * * *